(12) United States Patent
Robinson-Morgan et al.

(10) Patent No.: US 12,657,331 B2
(45) Date of Patent: Jun. 16, 2026

(54) SYSTEMS AND METHODS FOR USE IN GENERATING AUDIT LOGS RELATED TO NETWORK PACKETS

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US); John O'Neill, Darien, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 668 days.

(21) Appl. No.: 17/899,497

(22) Filed: Aug. 30, 2022

(65) Prior Publication Data

US 2023/0077960 A1 Mar. 16, 2023

Related U.S. Application Data

(60) Provisional application No. 63/238,993, filed on Aug. 31, 2021.

(51) Int. Cl.
*G06F 21/62* (2013.01)

(52) U.S. Cl.
CPC .. *G06F 21/6245* (2013.01); *G06F 2221/2101* (2013.01)

(58) Field of Classification Search
None
See application file for complete search history.

(56) References Cited

U.S. PATENT DOCUMENTS

| | | | | |
|---|---|---|---|---|
| 7,647,624 B2 * | 1/2010 | Burch | ................. | H04L 63/0807 |
| | | | | 713/181 |
| 9,853,977 B1 * | 12/2017 | Laucius | .............. | H04L 63/0884 |

(Continued)

FOREIGN PATENT DOCUMENTS

| | | | | | |
|---|---|---|---|---|---|
| CN | 109525583 A | * | 3/2019 | .......... | H04L 9/3257 |
| EP | 2953079 | | 12/2015 | | |

(Continued)

OTHER PUBLICATIONS

Buldas, A., Truu, A., Laanoja, R., Gerhards, R. (2014). Efficient Record-Level Keyless Signatures for Audit Logs. In: Bernsmed, K., Fischer-Hübner, S. (eds) Secure IT Systems. NordSec 2014. Lecture Notes in Computer Science( ), vol. 8788. Springer, Cham. https://doi.org/10.1007/978-3-319-11599-3_9 (Year: 2014).*

(Continued)

*Primary Examiner* — Ali H. Cheema
*Assistant Examiner* — Duilio Munguia
(74) *Attorney, Agent, or Firm* — Harness, Dickey & Pierce, P.L.C.

(57) ABSTRACT

Systems and methods are provided for generating audit log entries for data packet transactions. One example computer-implemented method includes, in response to a request to share data about a user with a first party, retrieving data identified in the request and generating a transaction ID for the request where the transaction ID is unique to the request to share the data. The method also includes compiling a data packet including at least the transaction ID and the identified data, and generating a signature value for the data packet. The method then further includes transmitting, by the computing device, the data packet to the first party as a transaction and appending an entry to an audit log, which includes the transaction ID and the signature value, but not the identified data.

14 Claims, 3 Drawing Sheets

(56) References Cited

U.S. PATENT DOCUMENTS

| | | | |
|---|---|---|---|
| 10,547,643 | B2 * | 1/2020 | Varley .................. H04L 9/3236 |
| 10,554,416 | B1 | 2/2020 | Yavuz |
| 10,865,136 | B2 | 12/2020 | Simpson et al. |
| 11,100,572 | B1 | 8/2021 | Hecht et al. |
| 11,232,449 | B1 | 1/2022 | Hecht |
| 11,233,799 | B1 | 1/2022 | Whyte et al. |
| 11,308,189 | B2 | 4/2022 | Sheets |
| 11,356,430 | B1 | 6/2022 | Kapczynski et al. |
| 11,386,223 | B1 | 7/2022 | Fakhraie et al. |
| 11,899,815 | B1 | 2/2024 | Fakhraie et al. |
| 2003/0065576 | A1 | 4/2003 | Harris et al. |
| 2007/0124820 | A1 * | 5/2007 | Burch .................. G06F 21/552 726/26 |
| 2010/0095372 | A1 * | 4/2010 | Hodgkinson ........... G06F 21/41 726/19 |
| 2010/0185871 | A1 | 7/2010 | Scherrer et al. |
| 2012/0131057 | A1 | 5/2012 | Youn et al. |
| 2013/0139229 | A1 | 5/2013 | Fried et al. |
| 2013/0283362 | A1 * | 10/2013 | Kress ...................... G06F 21/44 726/9 |
| 2014/0147020 | A1 | 5/2014 | Baldwin |
| 2014/0230032 | A1 | 8/2014 | Duncan |
| 2015/0363786 | A1 * | 12/2015 | Kolupaev ........... G06Q 20/322 705/44 |
| 2017/0193087 | A1 | 7/2017 | Savliwala et al. |
| 2017/0251025 | A1 | 8/2017 | Varley et al. |
| 2018/0060496 | A1 | 3/2018 | Bulleit et al. |
| 2018/0260582 | A1 | 9/2018 | Brouwer |
| 2019/0149524 | A1 * | 5/2019 | Bankston ........... H04L 63/0421 726/26 |
| 2019/0220898 | A1 | 7/2019 | Rhodes et al. |
| 2019/0243956 | A1 | 8/2019 | Sheets |
| 2019/0312733 | A1 * | 10/2019 | Engan .................. H04L 63/126 |
| 2019/0333054 | A1 * | 10/2019 | Cona ...................... H04L 9/3297 |
| 2019/0355065 | A1 | 11/2019 | Ramaratnam et al. |
| 2020/0136825 | A1 * | 4/2020 | Gupta .................. G06F 9/5077 |
| 2020/0250633 | A1 * | 8/2020 | Vinson ............... G06Q 20/3676 |
| 2020/0265046 | A1 * | 8/2020 | Tang ....................... G06F 21/64 |
| 2020/0374132 | A1 * | 11/2020 | Lobban ................. G06Q 10/00 |
| 2020/0387624 | A1 | 12/2020 | Dunjic et al. |
| 2021/0034778 | A1 | 2/2021 | Zamir et al. |
| 2021/0057061 | A1 * | 2/2021 | Bass ...................... G16H 40/20 |
| 2021/0081396 | A1 * | 3/2021 | Tian ...................... G06F 3/0649 |
| 2021/0204120 | A1 | 7/2021 | Nair |
| 2021/0258315 | A1 | 8/2021 | Dunjic et al. |
| 2021/0287770 | A1 | 9/2021 | Anderson et al. |
| 2022/0247570 | A1 * | 8/2022 | Watanabe ............. G06F 21/645 |
| 2023/0014970 | A1 * | 1/2023 | Gujarathi ................ H04L 63/10 |
| 2023/0064932 | A1 | 3/2023 | Robinson-Morgan et al. |
| 2023/0073938 | A1 | 3/2023 | Robinson-Morgan et al. |

FOREIGN PATENT DOCUMENTS

| | | |
|---|---|---|
| EP | 2993619 A1 | 3/2016 |
| WO | WO2019/179533 | 9/2019 |

OTHER PUBLICATIONS

Digital Identities and Verifiable Credentials, by Fridgen et al., published 2020 (Year: 2020); 11 pgs.

"xSTR-ekyc e-KYC use cases in digital financial services", ITU-T Draft; Study Period 2021-2024; Study Group 17, International Telecommunication Union, Geneva ; CH r vol. ties/17; Aug. 30, 2021 (Aug. 30, 2021), pp. 1-32, XP044313607, Retrieved from the Internet: URL:https://www-api.itu.int/ifa/t/2017/sgl 7/docs/210824/td/ties/plen/T17-SG17-210824-TD-PLEN-4081 !!ZIP-E.zip TD4081-Att.docx [retrieved on Aug. 30, 2021] section 10.3.1; figure 11.

Marcos Allende Lopez: "Self-Sovereign Identity The Future of Identity: Self-Sovereignity, Digital Wallets, and Blockchain", f Sep. 30, 2020 (Sep. 30, 2020), pp. 1-106, XP055805664, Retrieved from the Internet: URL:https://publications.iadb.org/publica tions/english/document/Self-Sovereign- Ident ity-The-Future-of-Identity-Self-Sovereigni ty-Digital-Wallets-and-Blockchain.pdf [retrieved onMay 19, 2021] p. 16-p. 29; figures 2,9.

PCT International Search Report and Written Opinion (12 pages) of PCT Patent Application No. PCT/US2022/042010, dated Dec. 20, 2022. PCT/US2022/042010. PCT/US2022/042010 has the same priority claim as the instant application.

* cited by examiner

300

SYSTEMS AND METHODS FOR USE IN GENERATING AUDIT LOGS RELATED TO NETWORK PACKETS

CROSS-REFERENCE TO RELATED APPLICATION

This application claims the benefit of, and priority to, U.S. Provisional Application No. 63/238,993, filed Aug. 31, 2021. The entire disclosure of the above application is incorporated herein by reference.

FIELD

The present disclosure is generally directed to systems and methods for use in generating audit logs related to network packets, and in particular, to systems and methods for use in generating audit logs suitable to provide verification of content of the network packets, for example, in connection with, as part of, etc., the network packets being communicated to relying parties.

BACKGROUND

This section provides background information related to the present disclosure which is not necessarily prior art.

In various networks, identities of users are often stored in either centralized or distributed storage (e.g., including personal identifying information (PII) for the users, etc.), and arranged to be disseminated in response to requests from the users and/or relying parties associated with the users. When such a request is received from a user and/or relying party, an identity provider (e.g., associated with the storage, etc.) compiles and transmits a packet, which includes requested PII for the user. Upon receipt, the user and/or relying party may use the packet to establish a new account for the user, or to otherwise commence a desired interaction between the user and the relying party, based on the PII included in the packet and treating the PII as verified information in view of the means by which it was received (i.e., from the identity provider, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
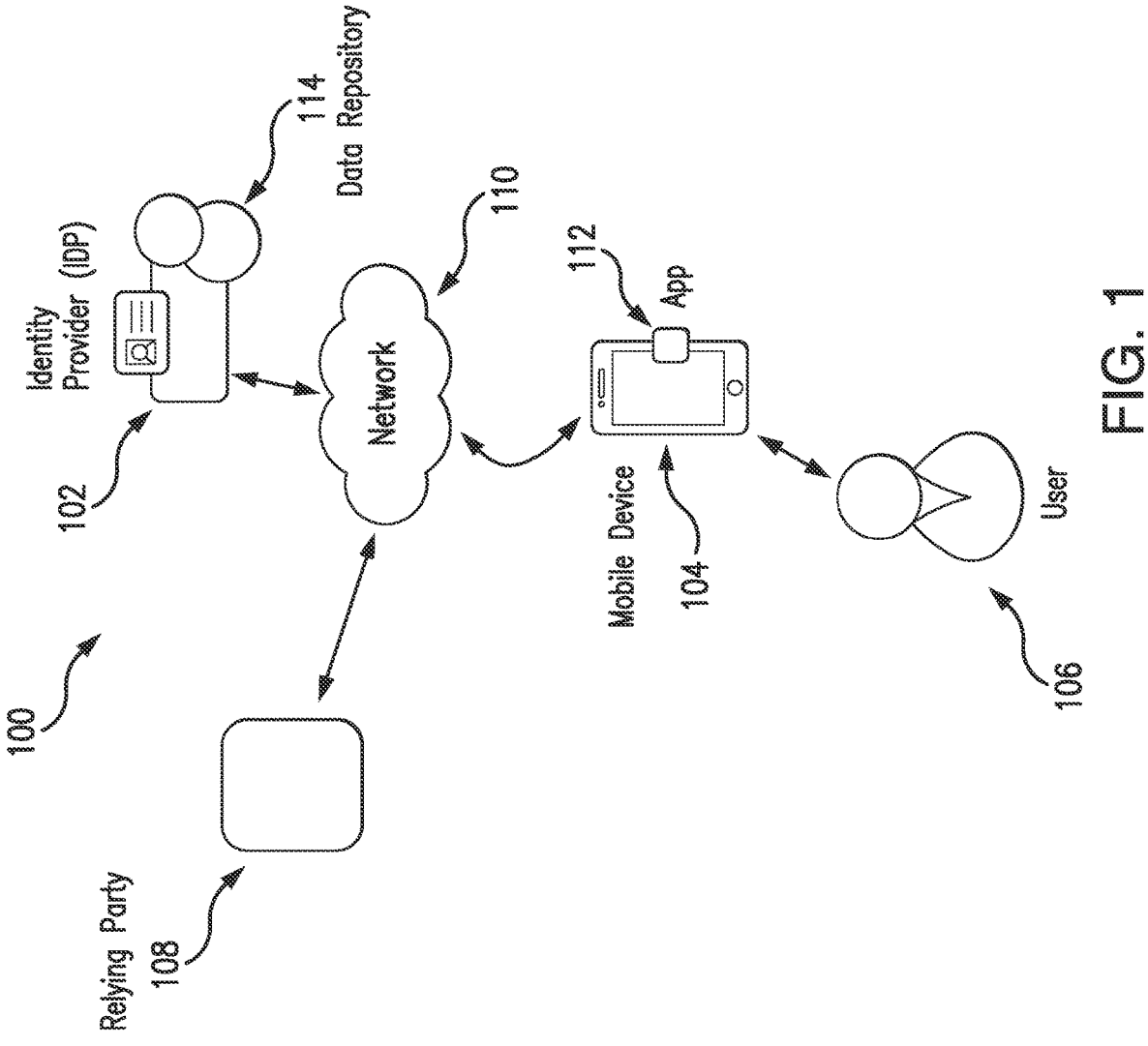
FIG. 1 illustrates an example system of the present disclosure suitable for use in generating audit logs related to network packets including, for example, personal identifying information (PII) for users.

Example embodiments will now be described more fully with reference to the accompanying drawings. The description and specific examples included herein are intended for purposes of illustration only and are not intended to limit the scope of the present disclosure.

Users are often associated with identities, to which the users are authenticated in connection with various activities, such as, for example, requesting or directing services (e.g., healthcare services, travel services, telecommunication services, etc.), establishing accounts (e.g., bank accounts, retirement accounts, email accounts, etc.), etc. The identities may be verified, for example, by an identity provider (IDP) and then compiled into digital identities. Then, when a user embarks on the above activities, the user may rely on his/her digital identity to establish that the user is who he/she claims to be. In connection therewith, upon request by the user (or relying party interacting with the user), the IDP, which compiled the digital identity, may provide personal identifying information (PII) to the relying party consistent with the digital identity. The relying party, then, may rely on the PII in interacting with the user. That said, it is possible that the PII, provided from the IDP, or the PII otherwise used by the relying party, may be errant, misunderstood, or incorrect, etc. In such situations, a dispute may arise between the IDP and the relying party as to the source of the errant, or wrong, information. Further, compilation of audit logs in connection with generating or using digital identities for/of users is often problematic, especially in connection with utilizing distributed identifying information, because the audit logs typically include the specific identifying information of the users as evidence of what was transmitted to relying parties. As such, by way of this compilation of the identifying information in the audit logs, the underlying distributed storage of such identifying information is bypassed in order to provide for the audit capabilities.

Uniquely, the systems and methods herein provide for audit logs, which are generated in connection with distribution of identifying information (e.g., PII, etc.) of users to relying parties, whereby the specific information provided to the relying parties may be verified (e.g., as part of an audit, etc.), at a later time. In particular, upon providing information for a user to a relying party (or receiving information from a relying party) (as a packet), an IDP employs a signature for the specific interaction (or transaction) (e.g., as generated based on the information and/or packet, etc.), and then stores the signature (e.g., a value associated with the signature, etc.) along with a transaction ID for the interaction in an audit log. When a need arises to prove the information (and/or the source of the information), the transaction ID is used to retrieve the original signature, and a second signature is recreated (or reproduced) based on data alleged to be included in the packet (e.g., by the relying party, etc.). If the reproduced signature matches the one previously generated and stored (based on the information previously transmitted to the relying party), the IDP is verified as the source of the information (and the corresponding information is verified). Conversely, if the reproduced signature does not match the one previously generated and stored, the IDP is able to dispute that the information used to recreate the signature was the information originally provided by the IDP. In this manner, the systems and methods herein provide for an audit log, for an information-based interaction or transaction involving an IDP and a relying party, where there is no need for the IDP to separately store, as part of an audit log, identifying information for a user that was sent to the relying party. Rather, the IDP may include a transaction ID and a signature for the identifying information (or packet thereof), associated with the transaction, in the audit log, and still be able to subsequently prove the contents thereof as needed (e.g., based on recreation of the signature, etc.). As such, security, as to the identifying information of the user, is enhanced over prior audit log techniques.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, interactions between users and relying parties, platforms for identity services and third party databases, privacy concerns and/or requirements, etc.

The illustrated system 100 generally includes an identity provider (IDP) 102, a mobile device 104 associated with a user 106, and a relying party 108, each of which is coupled to network 110. The network 110 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 110 may include multiple different networks, where one or more of the multiple different networks are then accessible to particular ones of the IDP 102 and the mobile device 104.

In this example embodiment, the IDP 102 in the system 100 generally is associated with forming and/or managing digital identities associated with users (e.g., the user 106, etc.).

In connection therewith, the IDP 102 is configured to participate in registering, provisioning, and storing (in secure memory) identity information (or attributes) associated with the users (e.g., including PII for the user 106, etc.), which may then be provided to one or more relying parties (e.g., the relying party 108, etc.), upon approval by the corresponding users. As such, the IDP 102 is configured to employ various techniques to verify and/or review identifying information associated with the users (e.g., verifying physical documents, verifying information with government agencies and/or third parties, etc.). Once verified, or verified consistent with certain techniques, the IDP 102 is configured to store the identifying information and/or provision a digital identity for the users in a repository 114, where the resulting digital identities include the specific identity information about the users that was verified. The identity information may include, without limitation, one or more different attributes of the users such as: names, pseudonyms, mailing addresses, billing addresses, email addresses, government ID numbers, phone numbers, dates of birth (DOB), places of birth, biometrics (e.g., facial images, etc.), gender, age, eye color, height, weight, hair color, account numbers, insurance identifiers, employee identifiers, and/or other information sufficient to distinguish, alone or in combination, the users from other users, etc.

In one example, as part of the above interaction with the IDP 102, the user 106 may capture an image of his/her passport via the mobile device 104, whereupon, the mobile device 104 is configured to capture the image of the passport. In addition, the user 106 may also be directed to capture a photo selfie of his/her face, whereby the user 106 interacts with the mobile device 104 to capture the photo selfie. In turn, the mobile device 104, or the IDP 102 (upon receipt of the images from the mobile device 104), may be configured to perform a verification that the passport is genuine. For instance, a document verifier (e.g., an application, a service, etc.) associated with the mobile device 104 or the IDP 102 may be configured to compare a photo of the user 106 in the image of the passport to the photo selfie captured via the mobile device 104. In doing so, document verifier may know or appreciate a template of the passport (or other document for which a comparison is to be made), including what security features should be present, what typeface and type size should be present, appropriate check digits, cross references to machine-readable zones, etc. Additionally, the document verifier may be configured to perform an NFC read of a cryptographic chip of the passport (or other document), checking/confirming signature and issuer keys, etc. Based on these checks, then, the document verifier may confirm to a level of confidence that the passport is genuine. Similar verification may be performed by the document verifier on other documents (e.g., driver's licenses, etc.). The mobile device 104 and/or the IDP 102 is then configured to add the image of the passport, and the underlying information included therein (and/or associated therewith as provided by the user 106), to a queue associated with the digital identity of the user 106. And, once added, the IDP 102 is configured to validate the passport (based on the captured image thereof), and information included therein, with an issuing authority associated with the passport (e.g., a government agency, a third party, etc.) (or, in examples where the document is other than a passport, another party associated with issuance of the given document (e.g., a bank in connection with verifying a bank account statement or other bank document, etc.), etc.), or other verification provider, etc. When the passport (and associated information) is validated, the IDP 102 is configured to add the passport and/or the underlying information to the digital identity of the user 106, which is included in the repository 114. It should be appreciated that various different processes and/or techniques may be employed, in cooperation with an issuing authority or other service, etc., to verify and validate documents provided by the user 106 and/or information included therein or associated therewith, prior to including the information in the digital identity.

Thereafter, the IDP 102 may be configured, as described in more detail below, to provide the identifying information from the document (and/or the document itself) to the relying party 108. The relying party 108 is permitted to trust the identifying information received for the user 106, in view of (and thereby relying on) the provisioning processes of the IDP 102.

The mobile device 104 in the illustrated system 100 includes a portable mobile device such as, for example, a tablet, a smartphone, a personal computer, etc. What's more, the mobile device 104 also includes a network-based application 112, which configures the mobile device 104 to communicate with the IDP 102. In the illustrated embodiment, the application 112 is provided by and/or associated with the IDP 102, as a standalone application. Alternatively, the application 112 may be provided as a software development kit (SDK) for integration in another application with one or more different purposes (e.g., as part of a financial application, an email application, a social-network application, a telecommunication application, a health application, etc.), whereby the SDK is provided by and/or associated with the IDP 102 and configures the mobile device 104 to interact with the IDP 102.

The relying party 108 in the system 100 may include any entity and/or person, which receives the identifying information for the user 106 and expects and/or intends to rely on the identifying information for one or more purposes. For example, the relying party 108 may include a financial institution (e.g., a bank, an investment broker, etc.), a utility provider, a telecommunication provider, a medical service provider, a potential employer, etc., with which the user 106 may interact for the desired product, service or interaction (and to which the user 106 may be required to verity his/her identity in order to receive the desired product, service or interaction).

While only one IDP 102, one mobile device 104, one user 106, and one relying party 108 are illustrated in the system 100, it should be appreciated that additional ones of these parts/parties may be included in other system embodiments. Specifically, for example, it should be appreciated that other system embodiments will generally include multiple other users and multiple other relying parties, etc.

Figure 2:
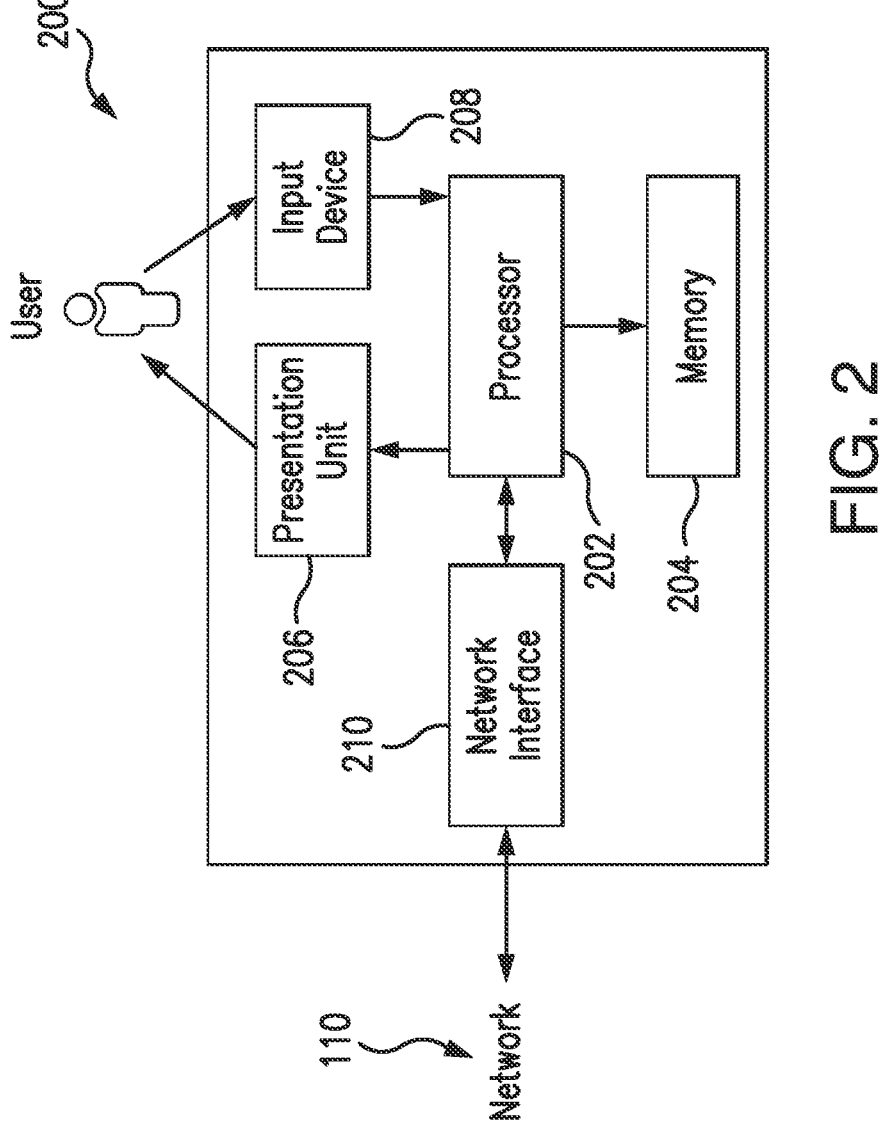
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the IDP 102, the mobile device 104, and the relying party 108 may be considered, may include, and/or may be implemented in a computing device consistent with the computing device 200, coupled to (and in communication with) the network 110. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identifying information (e.g., PII, etc.), signatures (or signature values), audit logs, validation packets, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor

202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., identifying information, requests to share identifying information, etc.), etc. And, various interfaces (e.g., as defined by the application 112, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user 106 (i.e., user inputs) of the computing device 200 such as, for example, images of documents, requests for sharing identifying information with relying parties, designations of specific identifying information to share, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein (e.g., network 110, etc.) and/or with other devices described herein. In some example embodiments, the computing device 200 may include the processor 202 and one or more network interfaces incorporated into or with the processor 202.

Referring again to FIG. 1, in this example embodiment, the user 106 is permitted to request (e.g., via the application 112 at the mobile device 104, etc.) that a document be added to his/her digital identity, or to share his/her digital identity, in whole or in part, with the relying party 108. In connection therewith, upon receiving the request, the IDP 102 is configured to generate an audit log, or more precisely, entries to the audit log. The audit log is generally intended to reflect the different data transactions or interactions between the IDP 102 and the user 106, the relying party 108, and third parties, etc. For instance, in the above example regarding the user 106 adding an image of his/her passport (and information corresponding to the passport) to the user's digital identity, the following process steps (or data transactions) may be employed to do so: (1) the user 106 captures a photo image of his/her passport; (2) the user 106 captures a photo selfie of his/her face; (3) the IDP 102 verifies that the passport is genuine; (4) the IDP 102 verifies that the photo selfie matches an image of the user 106 included in the user's passport; and (5) the IDP 102 validates passport data included in and/or provided with the passport image with an issuer of the passport (e.g., a government issuing agency, etc.). In connection therewith, each of the example steps may be recorded in the audit log (each with a transaction ID, and with the overall process then recorded with a group ID), together with an outcome of each step, to prove that the correct process was followed. The IDP 102 may then assert attributes of the user 106, such as a proof of age check, etc. (e.g., based on the outcome of one of the steps or data transactions, etc.), as appropriate, without needing to reveal the passport details or even that the age was verified using a passport (because the same steps are followed each time for verifying and/or validating passports or other documents, etc.).

Each of the data transactions or entries in the audit log for the user's digital identity is further associated with a user ID for the user 106, as well as the transaction ID (unique, specific, etc. to the transaction or process step), and, potentially, the group ID (e.g., a link between multiple transactions of a journey or session or process, etc.).

Generally, as part of the above, the user ID is kept within the IDP 102 and is used as a persistent identifier for the given digital identity of the user 106. As such, the user ID provides a link to all activity for the user's digital identity, including a link for all other identifiers associated with the digital identity (e.g., the transaction IDs, the group IDs, etc.). The IDP 102 generates the transaction ID(s) and group ID(s), as needed, either by random generation, incrementing a prior ID, selecting an available ID, other otherwise, and they are then associated with the user ID. In normal use, one user ID may have (or may be associated with) multiple transaction IDs and group IDs. In this way, any query or dispute from the relying party 108 with regard to the digital identity of the user 106, based on a transaction ID shared with the relying party 108, can be mapped back to the user ID for the user 106, whereby a full record of the interactions associated with the user's digital identity can be reviewed for accuracy (including that associated with the specific transaction ID shared with the relying party 108). In at least some embodiments, the user ID is never changed or reused and is never shared with another party. Further, it should be appreciated that the user ID may be associated with a particular instance of the user's identity. If the user 106 deletes their digital identity (or the given instance of the digital identity), all activity for that user ID would demise, yet the audit log may be preserved as a record. If the user 106 then creates a new digital identity with the same IDP 102, a new user ID would commence with no link to the prior user ID (and/or, potentially, to the prior audit log entries). In this way, the user ID may be viewed as being unique to the instance of a digital identity, and not to the user 106 (although this may be otherwise in other embodiments, for example, where the user ID may in fact be unique to the user 106).

That said, when the user 106 requests to share, for example, a name, address, and date of birth with the relying party 108 (e.g., based on a request from the user 106 via the application 112, or from the relying party 108, etc.), the IDP 102 is configured to retrieve the requested data from memory (e.g., the memory 204, etc.), and to generate a transaction ID for the transaction. In addition, the IDP 102 is configured to generate a cryptographic signature for the requested data (e.g., based on the requested data, etc.). In particular, the IDP 102 is configured to combine the requested data into a packet, together with an identifier of the relying party 108 (e.g., a name of the relying party 108, etc.), and to sign the packet with a private key of the IDP 102 (to thereby generate the cryptographic signature or a signature value for the packet). The IDP 102 is configured to transmit the signed packet (and identifying data therein) to the relying party 108, along with the transaction ID.

Importantly, the IDP 102 is configured to store the cryptographic signature (e.g., a signature value for the packet, etc.) along with the transaction ID for the packet in memory (e.g., the memory 204, etc.), as part of an audit log in the data repository 114 (or data structure, etc.) for the interaction/request. It should be appreciated, then, that the specific identifying information provided to the relying party 108, in the packet, is not included in the audit log, or saved apart from the original memory from which it was retrieved.

Later, if the relying party 108 disputes the requested data (e.g., the name, address, and date of birth of the user 106 as received from the IDP 102; etc.), or the accuracy of the requested data, the IDP 102 is configured to request the signed packet be returned by the relying party 108, along with the transaction ID and, potentially, an identification of the data requested. In response, the relying party 108 is configured to provide the data. The IDP 102 is configured to then generate or recreate the signature based on the data provided by the relying party 108. The IDP 102 is configured to also retrieve the signature for the transaction ID and to compare the recreated signature to the retrieved signature. If there is a match, the IDP 102 is configured to confirm the data as consistent with what was previously provided. If there is no match, the IDP 102 is configured to notify the relying party 108 that the data is changed, as compared to what was previously provided. In this regard, the content of the packet provided by the IDP 102 to the relying party 108 is used to create the signature, which is stored in the audit log. Similarly, in connection with the dispute by the relying party 108 of the data included in the packet, the content of the data provided by the relying party 108 back to the IDP 102 is used to recreate the signature. The two signatures can then be compared to determine if the content of data provided by the relying party 108 back to the IDP 102 is the same as the content of the packet originally provided by the IDP 102 to the relying party 108 (i.e., if the content of the packet is A, the signature will always be B; and if the content of the packet is not A, the signature will never be B).

Alternatively, in other embodiments, in response to a dispute of data by the relying party 108, the IDP 102 may be configured to retrieve the identified data, as above, to combine the data, and finally, to sign the data with the retrieved signature, thereby forming a new (or another) signed packet. The IDP 102 is configured to compare the new signed packet with the signed packet received from the relying party 108. If there is a match, the IDP 102 is configured to confirm the data as consistent with what was previously provided. If there is no match, the IDP 102 is configured to notify the relying party 108 that the data is changed, as compared to what was previously provided.

That said, the IDP 102 may be configured to perform the above signature and signed packet generation for each transaction between the user 106 and the IDP 102, between the IDP 102 and the relying party 108, and between the IDP 102 and any other party (as it relates to the user's identifying information), etc. In this way a record may be established for all such interactions (or transactions), but without the record including any actual identifying information for the user 106.

In addition, particular ones of the transactions may be combined into specific processes performed by the IDP 102. For example, a journey or session may be defined by multiple transactions, which results in a digital identity being provisioned within the IDP 102, or being modified (e.g., an address changed, etc.), or being verified (e.g., using authority verification, etc.). For example, a provisioning journey may include the following transactions: receiving a document image from the user 106 (via the mobile device 104), verifying with the mobile device 104 an image of (or associated with) the document based on a biometric of the user 106, requesting verification of the image with an issuing authority, and receiving verification of the image from the issuing authority, etc. The system 100, and in particular, the IDP 102, is configured then to provide an entry in an audit log in the repository 114, for each transaction making up the journey or session. As a result, each transaction making up the journey or session may be independently verified through the participants in the associated transaction (e.g., by transaction ID and signature, etc.). The IDP 102 may be configured to further generate a group ID for the journey or session, and append the group ID, along with the transaction ID, to each entry in the audit log in the repository 114. In this manner, the IDP 102 is permitted to define the journey (or session) by the transactions included therein, and provide for audit of both the individual transactions and/or the entire journey or session, etc.

Moreover, by defining the processes (of the journey, etc.) by transactions, as above, the IDP 102 is configured to prove that a specific process (as defined by the IDP 102 or another) was, in fact, performed in connection with provisioning a digital identity, modifying a digital identity, providing identifying information from a digital identity, etc. In this example embodiment, by proving each process relating to the action to be taken for the digital identity, and an audit ability for errant information, then, the IDP 102 is able to demonstrate whether or not the IDP 102 was the source of the errant data relied on by another party.

Figure 3:
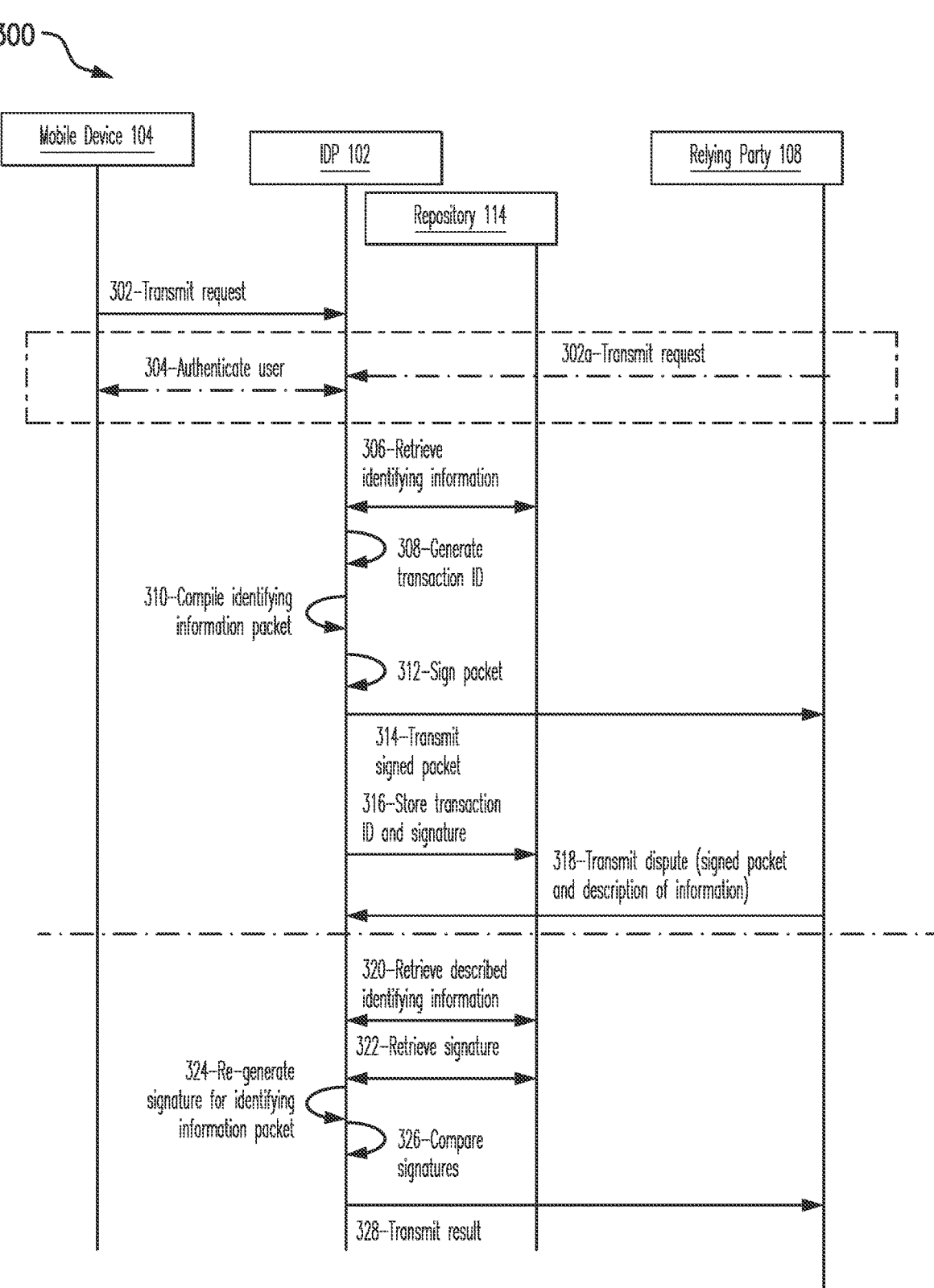
FIG. 3 illustrates an example method, which may be implemented in connection with the system of FIG. 1, for use in generating an audit log for a network packet, and specifically, for content of the network packet (e.g., PII for a user, etc.) for subsequent confirmation thereof.

FIG. 3 illustrates an example method 300 for use in generating an audit log for a transaction associated with a digital identity. The example method 300 is described as implemented in system 100, with reference to the IDP 102, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

Initially, in method 300, the mobile device 104 transmits (e.g., via the application 112, etc.) a request, at 302, to the IDP 102 to share identifying information for the user 106 with the relying party 108. The request may include, without limitation, an identification of the relying party 108, a description of the identifying information to be provided (e.g., name, address, contact information, IDs, biometrics, etc.), and also a user ID for the user 106 (e.g., a unique ID, phone number, email address, etc.), etc. The request may be transmitted, from the user 106, at the mobile device 104, via the application 112. For example, the application 112 may include a digital identity application, or another application with digital identity functionality, whereby the user 106 is permitted to provide, to the IDP 102, an identification of the relying party 108 and an indication of the identifying information to be shared.

While the request is shown as transmitted from the user 106 (at 302), alternatively (as indicated by the dashed box and dotted lines in FIG. 3), the relying party 108 may transmit, at 302a, the request to the IDP 102. In this alternative, the request may include, without limitation, an identification of the user 106, a description of the identifying information to be provided (e.g., a name, address, contact information, IDs, biometrics, etc.), and also a relying party ID (e.g., a unique ID, etc.) for the relying party 108, etc. In response, the IDP 102 may authenticate the user 106, at the mobile device 104, at 304, in order to verify the user's permission to share the requested identifying information with the relying party 108. For example, the IDP 102 may request a biometric or a passcode, via the application 112, in the mobile device 104, whereby the user 106 provides the biometric and/or passcodes, and whereby the IDP 102 verifies the same against the user's identifying information or other data specific to the user 106, etc. In connection therewith, the user 106 may also be requested to confirm permission to share the requested identifying information with the relying party 108, and in particular, the described information in the request (e.g., "Do you consent to share the following information with Company A: [NAME], [SO-CIAL SECURITY NUMBER], [MOTHER'S MAIDEN NAME], [FINGERPRINT DATA]?", etc.) Such authentication in method 300, then, may include consent to all the listed information, and consent per information included in the request.

Regardless of the origin of the request, in method 300, the IDP 102 retrieves, at 306, the identifying information included in the request from the repository 114. The IDP 102 also generates, at 308, a transaction ID specific to the transaction between the IDP 102 and the relying party 108 (and which is to be identified to (or associated with) the data being provided). The transaction ID may be randomly generated or selected from a listing of unused transaction IDs, or it may include an increment of a prior transaction ID used for another transaction, etc. Additionally, the transaction ID may be unique within the IDP 102 (such that the same transaction ID is not used twice or for different transactions, etc.). The IDP 102 then compiles, at 310, an identifying information packet (or data packet), which includes, in this example embodiment, the transaction ID for the transaction, the identifying information identified in the request, and the name of the relying party 108 (e.g., Company A, etc.), etc. In some examples, a source of the identifying information (e.g., a passport, a driver's license, a financial statement, etc.) may also be included in the packet. Table 1 provides an example representation of the identifying information packet, in part, and example data that may be included therein (based on the request). The content of the packet, then, may include a concatenation of the information such as, for example, {"Transaction ID": "1234567890","Relying Party": "Company A","Name": "John Smith","Address": "123 Main St.","Date of Birth": "Jan. 2, 1980"}, and a suitable algorithm may be applied thereto (whereby a signature value for the data packet may be generated, in addition to a header portion and a content portion, etc.), such as, for example, a version of the secure hashing algorithm or SHA (e.g., SHA-2, SHA-3, etc.), or message digest algorithm 5 (i.e., MD5), or a RIPEMD-160 hashing algorithm, etc. For instance, a JWT signature algorithm (see, e.g., https://jwt.io, etc.) may be applied to the data packet. In connection therewith, Table 2 illustrates an example resulting data packet following application of the algorithm. The resulting data packet will generally include the header portion, the data content portion, and the signature value portion, where the signature value portion is the only part of the data packet that is stored herein as part of the audit log. In this way, then, the IDP 102 generates the signature (or signature value) for the transaction based on the content of the packet.

TABLE 1

| Transaction ID: 1234567890 | | |
| --- | --- | --- |
| Data Type | Value | Relying Party |
| Name | John Smith | Company A |
| Address | 123 Main St. | |
| Date of Birth | Jan. 2, 1980 | |

TABLE 2

| Full Data Packet | eyJhbGciOiJIUzI1NiIsInR5cCI6IkpXVCJ9.eyJUcmFuc2FjdGlvbiBJRCI6IjEyMzQ1Njc4OTAiLCJSZWx5aW5nIFBhcnR5IjoiQ29tcGFueSBBIiwiTmFtZSI6IkpvaG4gU21pdGgiLCJBZGRyZXNzIjoiMTIzIE1haW4gU3QuIiwiRGF0ZSBvZiBCaXJ0aCI6IjEjAxLzAyLzAiLzE5ODAifQ.aKvgHS22OcojhjZtbAeJKhR66xfSH3js9kZN__isALz8 |
| --- | --- |
| Header Portion of Data Packet | eyJhbGciOiJIUzI1NiIsInR5cCI6IkpXVCJ9 |
| Content Portion of Data Packet | eyJUcmFuc2FjdGlvbiBJRCI6IjEyMzQ1Njc4OTAiLCJSZWx5aW5nIFBhcnR5IjoiQ29tcGFueSBBIiwiTmFtZSI6IkpvaG4gU21pdGgiLCJBZGRyZXNzIjoiMTIzIE1haW4gU3QuIiwiRGF0ZSBvZiBCaXJ0aCI6IjEjAxLzAyLzAiLzE5ODAifQ |
| Signature Value Portion of Data Packet | aKvgHS22OcojhjZtbAeJKhR66xfSH3js9kZN__isALz8 |

With continued reference in FIG. 3, the IDP 102 then signs the packet (e.g., after application of the algorithm thereto, etc.) with a private key (or secret) of the IDP 102, at 312 (e.g., whereby the signed packet is generally consistent with a JSON web token, etc.). The IDP 102 then transmits the signed packet to the relying party 108, at 314, in response to the request.

The IDP 102 further appends, at 316, an entry to an audit log for the transaction, which includes the transaction ID and the signature (or signature value) for the signed packet (e.g., based on the algorithm applied to the content of the packet and/or the private key used to sign the packet, etc.). Table 3 provides an example illustration of the entry in the audit log, as stored therein by the IDP 102 for the above transaction (illustrated in Tables 1 and 2). As described above, the audit log may be associated with the user 106 by way of a user ID, whereby the transaction ID is then linked to the user ID in the audit log.

TABLE 3

| Transaction ID | Date/Time | Signature Value |
| --- | --- | --- |
| 1234567890 | 07/08/20XX 13:34:26 | aKvgHS22OcojhjZtbAeJKhR66xfSH3js9kZN__isALz8 |

It should be appreciated that the stored entry in the audit log does not include the identifying information for the user 106, in whole or in part. It instead includes only the signature value as representative of the identifying information (e.g., as linked with the transaction ID, etc.). As such, in the present disclosure, the audit log does not create a further stored instance of the identifying information of the user 106, which may, in some embodiments, create additional security opportunities (and potential security concerns) for storing the identifying information, by the IDP 102. That said, in some embodiments the audit log may also include an indication of the type of information included in the data packet (but not the actual information), for instance in the above example, name, address, and date of birth, etc. Notwithstanding the above, it should still be appreciated that in some instances, the entire data packet or part thereof may still be maintained in the audit log.

Thereafter, the relying party 108 decrypts the signed packet (e.g., by way of a public key of a private/public key pair associated with the private key of the IDP 102, etc.), and uses the contained identifying information for its intended purposes. The intended purpose may include, as described above, interacting with the user 106 for a desired product or service, or as part of another interaction between the user 106 and the relying party 108. In addition, the relying party 108 may maintain proof of the identifying information, as a log, in which the relying party 108 stores the data received from the IDP 102 (i.e., the signed packet). The public-private key pair used by the IDP 102 and the relying party 108 may include a global key pair, used for all interactions between the IDP 102 and relying party 108 and rotated or changed at desired intervals. Or, the public-private key pair may be a key pair specific to each interaction between the IDP 102 and the relying party 108.

Subsequently in the method 300, the relying party 108 may have one or more issues with the identifying information relied on as part of providing one or more products, services or interactions to the user 106, whereby a source of the identifying information or an accuracy of the identifying information itself may need to be verified and/or challenged. For example, when the relying party 108 confirms certain information related to the user 106 is errant, the relying party 108 may pursue the IDP 102 as a potential source of the errant information. In connection therewith, the relying party 108, as shown in FIG. 3, transmits a dispute to the IDP 102, at 318. The dispute includes, for example, the signed packet received from the IDP 102, based on step 314 (e.g., the relying party 108 re-presents the packet it claims to have received at 314, etc.), a description of the information that was included, the transaction ID and, potentially, an identifier of the relying party 108, etc.

In response, the IDP 102 retrieves, at 320, the described identifying information (as indicated in the dispute) and further retrieves, at 322, the signature for the transaction from the audit log based on the transaction ID. Once retrieved, the IDP 102 recompiles (or regenerates) another (or new) signature value for the packet received from the relying party 108, at 324 (consistent with the compilation of the packet, at step 310, as provided above) (e.g., via the same technique, scheme, algorithm, private key, etc.). In doing so, the IDP 102 may first decrypt the signed packet received from the relying party 108 in order to process the underlying content of the packet (and then re-sign the packet after re-processing, for example, based on the same technique, scheme, algorithm, etc. applied in generating the original signature value).

Then, at 326, the IDP 102 compares the signed value for the identifying information packet originally sent to the relying party 108, from step 312, to the re-generated signed value for the packet received from the relying party 108 as part of the dispute, and at 318. And, at 328, the IDP 102 transmits a result of the comparison to the relying party 108. When there is a match, the identifying information included in the original packet is confirmed, and the result is indicative of the confirmation. But, when there is not a match, the original packet, and the underlying data, are not confirmed, and the result is indicative of the failed confirmation.

In the example above, with reference to Table 1, if Company A claims that the data packet being returned to the IDP 102 references Jane Smith (instead of John Smith), the IDP 102 could regenerate the signature for the data packet using the same algorithm and private key applied at steps 310-312 in generating the original signature value. In doing so, if the returned data packet truly references Jane Smith, the re-generated signature value would be different to that stored in audit log so the IDP 102 (or relying party 108) could prove that the data packet being returned by the relying party 108 is different from the data packet that was sent by the IDP 102.

It should be appreciated that the identifier of the relying party 108 may be inherent in the request to share and/or the dispute (e.g., tagged through access to receive identifying information, or to submit the dispute, etc.). As such, when the identifier is included in the packet (e.g., Company A in Table 1, etc.), the packet is specific to the relying party 108. Consequently, if a different party submitted the packet and the transaction ID, with a dispute, the identifier of the different party would be included in the dispute, and would, as apparent from the above, cause a mismatch between the signed packet, and the signed packet from step 312.

It should further be appreciated that method 300, or a variation thereof, may be employed with any different identifying information transaction between the IDP 102 and a third party. For example, a verification party may be included (in place of the relying party 108), where the IDP 102 transmits an image for verification (e.g., an image of a passport or driver's license, or an insurance card, or a biometric (e.g., a facial image, etc.), etc.), by the verification provider, and then receive a verified or not verified response thereto. Both the image originally transmitted, and the response may be added to the audit log, via the steps included in method 300.

That said, the systems and methods of the present disclosure may be applied to any data packet, regardless of the party that generated and/or provided the data packet. For instance, systems and methods herein may be applied to data packets including data manually entered by users, data sent to relying parties, data received from integrated voice processing systems, etc. What's more, the same data packet (regardless of origin, etc.) will always produce the same signature (or signature value). In this way, by maintaining the unique signatures in the audit log for each individual transaction, the unique signatures may be used to prove (or disprove) any claims as to the content of the data packet they received for the transactions.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) in response to a request to share data about a user with a first party, retrieving data identified in the request; (b) generating a transaction ID for the request, the transaction ID unique to the request to share the data; (c) compiling a data packet including at least the transaction ID and the retrieved data; (d) generating a signature value for the data packet; (e) transmitting the data packet to the first party as a transaction; (e) appending an entry to an audit log, which includes the transaction ID and the signature value, but not the retrieved data, thereby enabling subsequent verification of the data packet transmitted to the first party; (f) receiving the request from the user, via a mobile device associated with the user; (g) receiving a dispute from the first party for the transaction, the dispute including the transaction ID and said data packet; (h) retrieving the signature value from the audit log based on the transaction ID; (i) generating a second signature value for the data packet received from the first party; (j) comparing the second signature value for the data packet received from the first party to the signature value for the data packet transmitted to the first party; (k) transmitting a result of the comparison to the first party; (l) generating a group ID associated with a journey including the request to share the data with the first party; and/or (m) signing the data packet with a private key prior to transmitting the data packet to the first party.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in generating audit logs for data packet transactions, the method comprising:

receiving, from a user, via a mobile device associated with the user, a request to share identifying data specific to a user with a computing device of a first party;

in response to the request, retrieving, by an identity provider computing device, the identifying data identified in the request, the identity provider computing device separate from the computing device of the first party;

generating, by the identity provider computing device, a transaction ID specific to the request, the transaction ID unique to the request to share the identifying data;

generating a group ID associated with a journey including the request to share the identifying data with the first party;

compiling, by the identity provider computing device, a data packet including at least the transaction ID and the retrieved identifying data;

applying, by the identity provider computing device, a hashing algorithm to the data packet to generate a signature value for the data packet;

transmitting, by the identity provider computing device, the data packet to the computing device of the first party as a transaction; and appending, by the identity provider computing device, an entry to an audit log, which includes the transaction ID and the signature value, but not the retrieved identifying data included in the data packet, thereby enabling subsequent verification of the data packet transmitted to the first party, based on the transaction ID; and wherein the entry and at least one other entry to the audit log include the group ID.

2. The computer-implemented method of claim 1, wherein the first party includes one of a relying party and a verification provider.

3. The computer-implemented method of claim 1, wherein compiling the data packet includes compiling the data packet to include an identifier of the first party.

4. The computer-implemented method of claim 1, wherein the retrieved identifying data includes a government ID number, a birth date, and/or a phone number.

5. The computer-implemented method of claim 1, further comprising:

receiving, by the computing device, a dispute from the first party for the transaction, the dispute including the transaction ID and said data packet;

retrieving, by the computing device, the signature value from the audit log based on the transaction ID;

applying the hashing algorithm to the data packet to generate a second signature value for the data packet received from the first party;

comparing the second signature value for the data packet received from the first party to the signature value for the data packet transmitted to the first party; and transmitting a result of the comparison to the first party.

6. The computer-implemented method of claim 1, further comprising signing, by the computing device, the data packet with a private key prior to transmitting the data packet to the first party.

7. A system for use in generating audit logs for data packet transactions, the system comprising:

an identification provider (IDP) computing device including a processor, a memory, the memory including executable instructions, the processor configured, by the executable instructions, to:

receive, from a user, via a mobile device associated with the user, a request to share identifying data specific to a user with a computing device of a relying party;

in response to the request, retrieve the identifying data identified in the request;

generate a transaction ID for the request, the transaction ID unique to the request to share the identifying data;

generate a group ID associated with a journey including the request to share the identifying data with the first party;

compile a data packet including at least the transaction ID and the retrieved identifying data;

apply a hashing algorithm to the data packet to generate a signature value for the data packet;

transmit the data packet to the relying party as a transaction; and append an entry to an audit log included in a data repository, the entry including the transaction ID and the signature value, but not the retrieved identifying data included in the data packet, thereby enabling subsequent verification of the data packet transmitted to the relying party, based on the transaction ID; and wherein the entry and at least one other entry to the audit log include the group ID.

8. The system of claim 7, wherein the IDP computing device is further configured to sign the data packet with a private key, specific to the IDP computing device, prior to transmitting the data packet to the relying party.

9. The system of claim 7, wherein the retrieved identifying data includes a government ID number.

10. The system of claim 7, wherein the IDP computing device is further configured to:

receive a dispute from the relying party for the transaction, the dispute including the transaction ID and said data packet;

retrieve the signature value from the audit log based on the transaction ID;

apply the hashing algorithm to generate a second signature value for the data packet received from the relying party;

compare the second signature value for the data packet received from the relying party to the signature value for the data packet transmitted to the relying party; and transmit a result of the comparison to the relying party.

11. A non-transitory computer-readable storage medium comprising executable instructions for use in generating audit logs for data packet transactions, which when executed by at least one processor, cause the at least one processor to:

receive, from a user, via a mobile device associated with the user, a request to share identifying data specific to a user with a computing device of a first party;

in response to the request, retrieve the identifying data identified in the request;

generate a transaction ID for the request, the transaction ID unique to the request to share the identifying data;

generate a group ID associated with a journey including the request to share the identifying data with the first party;

compile a data packet including at least the transaction ID and the retrieved identifying data;

apply a hashing algorithm to the data packet to generate a signature value for the data packet;

transmit the data packet to the first party as a transaction; and append an entry to an audit log, which includes the transaction ID and the signature value, but not the retrieved data included in the data packet, thereby enabling subsequent verification of the data packet transmitted to the first party, based on the transaction ID; and wherein the entry and at least one other entry to the audit log include the group ID.

12. The non-transitory computer-readable storage medium of claim 11, wherein the first party includes a relying party; and wherein the retrieved identifying data includes a government ID and a birth date.

13. The non-transitory computer-readable storage medium of claim 11, wherein the executable instructions, when executed by the at least one processor, cause the at least one processor to:

compile the data packet to include an identifier of the first party; and sign the data packet with a private key, prior to transmitting the data packet to the first party.

14. The non-transitory computer-readable storage medium of claim 11, wherein the executable instructions, when executed by the at least one processor, further cause the at least one processor to:

receive a dispute from the first party for the transaction, the dispute including the transaction ID and said data packet;

retrieve the signature value from the audit log based on the transaction ID;

apply the hashing algorithm to generate a second signature value for the data packet received from the first party;

compare the second signature value for the data packet received from the first party to the signature value for the data packet transmitted to the first party; and transmit a result of the comparison to the first party.

\* \* \* \* \*